(12) United States Patent
Gu et al.

(10) Patent No.: US 9,517,915 B2
(45) Date of Patent: Dec. 13, 2016

(54) FILM COATING APPARATUS AND FILM COATING METHOD

(71) Applicants: BOE TECHNOLOGY GROUP CO., LTD., Beijing (CN); BOE Optical Science and Technology Co., Ltd., Suzhou (CN)

(72) Inventors: Zhenghe Gu, Beijing (CN); Chunlei Cao, Beijing (CN)

(73) Assignees: BOE TECHNOLOGY GROUP CO., LTD., Beijing (CN); BOE OPTICAL SCIENCE AND TECHNOLOGY CO., LTD., Suzhou (CN)

( * ) Notice: Subject to any disclaimer, the term of this patent is extended or adjusted under 35 U.S.C. 154(b) by 250 days.

(21) Appl. No.: 14/315,976

(22) Filed: Jun. 26, 2014

(65) Prior Publication Data

US 2015/0314582 A1    Nov. 5, 2015

(30) Foreign Application Priority Data

Apr. 30, 2014   (CN) .......................... 2014 1 0181150

(51) Int. Cl.
   *B65H 37/04*      (2006.01)
   *B32B 37/00*      (2006.01)
   (Continued)

(52) U.S. Cl.
   CPC ........... *B65H 37/04* (2013.01); *B32B 37/0046* (2013.01); *B32B 38/1833* (2013.01); *B29C 63/04* (2013.01);
   (Continued)

(58) Field of Classification Search
   CPC ...... B32B 37/22; B32B 38/0004; B32B 38/18; Y10T 156/12; Y10T 156/1085
   See application file for complete search history.

(56) References Cited

FOREIGN PATENT DOCUMENTS

| CN | 201514529 U | 6/2010 |
|---|---|---|
| CN | 202011487 U | 10/2011 |

(Continued)

OTHER PUBLICATIONS

Chinese First Office Action dated Oct. 8, 2015 corresponding to Chinese application No. 201410181150.7.

*Primary Examiner* — Mark A Osele
*Assistant Examiner* — Christopher C Caillouet
(74) *Attorney, Agent, or Firm* — Nath, Goldberg & Meyer; Joshua B. Goldberg; Scott H. Blackman

(57) ABSTRACT

Embodiments of the present invention provide a film coating apparatus and a film coating method, relating to the field of manufacturing of display devices. The film coating apparatus comprises a feeding unit, an attaching unit and a cutting unit, which are arranged on a base, wherein the feeding unit is configured to feed a film to be attached to the surface of a product; the attaching unit is connected to the feeding unit and configured to attach the film onto the surface of the product; and the cutting unit is connected to the feeding unit and configured to cut the film. According to the present invention, the film coating of a light guide plate, a semi-finished backlight product and a finished backlight product can be achieved, the labor intensity of operators is greatly reduced, the productivity is liberated, and the production efficiency is further improved. Meanwhile, coating deviation resulted from human factors is avoided, and the bottleneck in the automation of producing TFT-LCDs is overcome.

14 Claims, 3 Drawing Sheets

(51) Int. Cl.
  *B32B 38/00* (2006.01)
  *B32B 37/22* (2006.01)
  *B32B 38/18* (2006.01)
  *B29C 63/04* (2006.01)

(52) U.S. Cl.
  CPC ............ *B32B 37/0053* (2013.01); *B32B 37/22* (2013.01); *B32B 38/0004* (2013.01); *B32B 38/18* (2013.01); *B32B 2457/202* (2013.01); *B65H 2301/5162* (2013.01); *B65H 2801/61* (2013.01); *Y10T 156/1085* (2015.01); *Y10T 156/12* (2015.01)

(56) References Cited

FOREIGN PATENT DOCUMENTS

| | | |
|---|---|---|
| CN | 102463727 A | 5/2012 |
| CN | 202499589 U | 10/2012 |
| CN | 202743512 U | 2/2013 |
| CN | 203306277 U | 11/2013 |
| CN | 103551842 A | 2/2014 |
| JP | 2003104622 A | 4/2003 |
| JP | 2007160697 A | 6/2007 | ated manually. Even in some relatively advanced factories, the film coating is still accomplished manually with the aid of assistant tools. However, the manual film coating of a light guide plate, a semi-finished backlight product and a finished backlight product requires a lot of manual labor, thereby causing huge consumption of both labor and costs. Furthermore, coating deviation may be resulted from human factors during the manual film coating process. In addition, with the automation of other procedures in a TFT-LCD production line, the film coating will gradually become the bottleneck in the automation of producing TFT-LCDs.

FILM COATING APPARATUS AND FILM COATING METHOD

FIELD OF THE INVENTION

The present invention relates to the field of manufacturing of display devices, in particular to a film coating apparatus and a film coating method.

BACKGROUND OF THE INVENTION

During the manufacturing of TFT-LCDs (Thin Film Transistor-Liquid Crystal Display), the production of backlight sources requires a completely dust-free production environment, and thus the requirement on the environment is quite high. To meet the above requirement, light guide plates, semi-finished backlight products and finished backlight products need to be coated with films before being stored and transported.

In the existing production process, the film coating of a light guide plate, a semi-finished backlight product and a finished backlight product is completely accomplished manually. Even in some relatively advanced factories, the film coating is still accomplished manually with the aid of assistant tools. However, the manual film coating of a light guide plate, a semi-finished backlight product and a finished backlight product requires a lot of manual labor, thereby causing huge consumption of both labor and costs. Furthermore, coating deviation may be resulted from human factors during the manual film coating process. In addition, with the automation of other procedures in a TFT-LCD production line, the film coating will gradually become the bottleneck in the automation of producing TFT-LCDs.

SUMMARY OF THE INVENTION

Embodiments of the present invention provide a film coating apparatus and a film coating method, by which the film coating of a light guide plate, a semi-finished backlight product and a finished backlight product can be achieved, so that the labor intensity of operators is greatly reduced, the productivity is liberated, and the production efficiency is further improved. Meanwhile, the bottleneck in the automation of producing TFT-LCDs is overcome.

To achieve the above objects, the embodiments of the present invention employ the following technical solutions:

In a first aspect, the embodiments of the present invention provide a film coating apparatus, comprising:

a feeding unit, an attaching unit and a cutting unit, which are arranged on the base, wherein the feeding unit is configured to feed a film to be attached onto the surface of a product;

the attaching unit is connected to the feeding unit and configured to attach the film to the surface of the product; and the cutting unit is connected to the feeding unit and configured to cut the film.

In a first embodiment, according to the first aspect, the feeding unit comprises a film storage unit, a feeding assembly, a first rotatable clamp and a second rotatable clamp which are symmetrically disposed, a first drawing assembly and a second drawing assembly which are symmetrically disposed, and at least one guide rail, wherein the film storage unit is configured to place the film;

the feeding assembly is configured to support and fix the film;

the first rotatable clamp and the second rotatable clamp are configured to clamp the film;

the first drawing assembly is connected to the first rotatable clamp and configured to drive the first rotatable clamp to move backward and forward in the film feeding direction;

the second drawing assembly is connected to the second rotatable clamp and configured to drive the second rotatable clamp to move backward and forward in the film feeding direction; and the at least one guide rail is configured to position the product so that a coating portion of the product is located within a film coating region of the film coating apparatus.

In a second embodiment, the feeding assembly comprises a feeding compression cylinder and a feeding roller set, wherein the feeding compression cylinder is configured to move downward to compress the feeding roller set; and the feeding roller set is connected to the feeding compression cylinder and configured to support the film.

In a third embodiment, the first rotatable clamp comprises a first clamp head, a first motor, a first left-right cylinder, and a first front-back cylinder, wherein the first clamp head is configured to clamp the film;

the first motor is configured to control the first clamp head to rotate backward and forward in the film feeding direction;

the first left-right cylinder is configured to control the first clamp head to move in a left-right direction with the first clamp head being in connection with the first drawing assembly so as to finely adjust the position of the first clamp head in the left-right direction;

the first front-back cylinder is configured to control the first clamp head to move in a back-forth direction with the first clamp head being in connection with the first drawing assembly so as to finely adjust the position of the first clamp head in the front-back direction; and the second rotatable clamp comprises a second clamp head, a second motor, a second left-right cylinder, and a second front-back cylinder, wherein the second clamp head is configured to clamp the film;

the second motor is configured to control the second clamp head to rotate backward and forward in the film feeding direction;

the second left-right cylinder is configured to control the second clamp head to move in the left-right direction with the second clamp head being in connection with the second drawing assembly so as to finely adjust the position of the second clamp head in the left-right direction; and the second front-back cylinder is configured to control the second clamp head to move in the back-forth direction with the second clamp head being in connection with the second drawing assembly so as to finely adjust the position of the second clamp head in the front-back direction.

In a fourth embodiment, the attaching unit comprises a pressing assembly, and a first ejector cylinder and a second ejector cylinder which are symmetrically disposed, wherein the pressing assembly is connected to the feeding unit and configured to press the film on the surface of the product, so that the film is closely attached to the surface of the product; and the first ejector cylinder and the second ejector cylinder are configured to eject the product.

In a fifth embodiment, the pressing assembly comprises a pressing cylinder and a roller, wherein the pressing cylinder is configured to move downward to compress the roller; and the roller is configured to press the film in a rolling manner, so that the film is closely attached to the surface of the product.

In a sixth embodiment, the cutting unit comprises a blade and a cutting cylinder, wherein the blade is connected to the feeding unit and configured to cut the film; and the cutting cylinder is connected to the blade and configured to control the blade to move to cut the film.

In a seventh embodiment, the guide rail further comprises a telescopic support frame configured to support the product.

In a second aspect, the embodiments of the present invention provide a method for film coating a product located within a film coating region of a film coating apparatus which comprises, on a base, a feeding unit, an attaching unit and a cutting unit. The film coating method includes:

a film feeding step of feeding a film onto the surface of the product by using of the feeding unit;

a film attaching step of closely attaching the film to the surface of the product by using of the attaching unit; and a film cutting step of cutting the film by using of the cutting unit.

In one embodiment, the film feeding step includes:

the first rotatable clamp and the second rotatable clamp of the feeding unit clamping two ends of a first material end of the film, respectively, so that, starting from the first material end, the film is drawn out from a film storage unit of the feeding unit and then passes through a feeding assembly of the feeding unit;

after the product is positioned through at least one guide rail of the feeding unit to ensure that a coating portion of the product is located within the film coating region, a first drawing assembly and a second drawing assembly of the feeding unit driving the first rotatable clamp and the second rotatable clamp, clamping the two ends of the first material end, to move in a film feeding direction, so that the surface of the coating portion of the product is coated with the film drawn out from the film storage unit; and a first ejector cylinder of the attaching unit ejecting the product, and a feeding compression cylinder of the feeding unit moving downward to compress a feeding roller set of the feeding unit so as to fix the film.

In another embodiment, the film attaching step includes:

the first rotatable clamp and the second rotatable clamp rotating for the first time, and driving the film to wrap a first side face at the front end of the product, so that the first material end is attached to the first side face of the product;

the first rotatable clamp and the second rotatable clamp releasing the two ends of the first material end, respectively, and the first ejector cylinder resetting;

a pressing cylinder of the attaching unit moving downward to compress a roller of the attaching unit; and the first drawing assembly and the second drawing assembly resetting, and driving the roller to press the film fed onto the upper surface of the product in a rolling manner, so that the film is closely attached to the upper surface of the product.

In still another embodiment, the film cutting step includes:

the first rotatable clamp and the second rotatable clamp clamping two ends of a second material end of the film, respectively;

a cutting cylinder of the cutting unit controlling a blade of the cutting unit to move, so that the blade cuts the film;

a second ejector cylinder of the attaching unit ejecting the product;

the first rotatable clamp and the second rotatable clamp rotating for the second time, and driving the film to wrap a second side face at the back end of the product, so that the second material end is attached to the second side face of the product; and the first rotatable clamp and the second rotatable clamp releasing the two ends of the second material end, respectively, and the second ejector cylinder resetting.

In yet another embodiment, the film coating method further includes the following step of:

moving the product by using of at least one guide rail of the feeding unit, so that the coated portion of the product clears off the film coating region.

According to the second aspect, the first rotation of the first rotatable clamp and the second rotatable clamp refers to rotating forward in the film feeding direction, and the second rotation of the first rotatable clamp and the second rotatable clamp refers to rotating backward in the film feeding direction.

According to the film coating apparatus and the film coating method provided by the embodiments of the present invention, as a product can be coated with a film through the feeding unit, the attaching unit and the cutting unit which are all arranged on the base, the film coating of a light guide plate, a semi-finished backlight product and a finished backlight product can be achieved, the labor intensity of operators is greatly reduced, the productivity is liberated, and the production efficiency is further improved. Meanwhile, coating deviation resulted from human factors is avoided, and the bottleneck in the automation of producing TFT-LCDs is overcome.

BRIEF DESCRIPTION OF THE DRAWINGS

To describe the embodiments of the present invention or technical solutions in the prior art more clearly, the accompanying drawings to be used in the description of the embodiments or prior art will be briefly described. Apparently, the accompanying drawings in the following description are merely some embodiments of the present invention. For a person skilled in the art, various modifications and variations can be made to the implementation manners described herein without any creative efforts.

DETAILED DESCRIPTION OF THE EMBODIMENTS

The technical solutions disclosed in the embodiments of the present invention will be described clearly and completely with reference to the accompanying drawings in the embodiments of the present invention. Obviously, the embodiments described below are merely parts but not all of the embodiments of the present invention. Based on the embodiments disclosed by the present invention, all other embodiments made by a person skilled in the art without creative efforts shall fall into the protection scope of the present invention.

Herein, term 'and' merely shows an association between associated objects, and indicates that three relations may exist. For example, "A and B" may indicate three cases, that is, A exists separately, both A and B exist, and B exists separately.

In the existing production process, the film coating of a light guide plate, a semi-finished backlight product and a finished backlight product is completely accomplished manually. Even in some relatively advanced factories, the film coating is still accomplished manually with the aid of assistant tools. However, the manual film coating of a light guide plate, a semi-finished backlight product and a finished backlight product requires a lot of manual labor, thereby causing huge consumption of both labor and material costs. Furthermore, coating deviation may be resulted from human factors during the implementation. In addition, with the automation improvement of other procedures in a TFT-LCD production line, film coating will gradually become the bottleneck in the automation of producing TFT-LCDs.

By the film coating apparatus and the film coating method provided by the present invention, the film coating of a light guide plate, a semi-finished backlight product and a finished backlight product may be achieved, the labor intensity of operators is greatly reduced, the productivity is liberated, and the production efficiency is further improved. Meanwhile, coating deviation resulted from human factors is avoided, and the bottleneck in the automation of producing TFT-LCDs is overcome.

Embodiment 1

Figure 1:
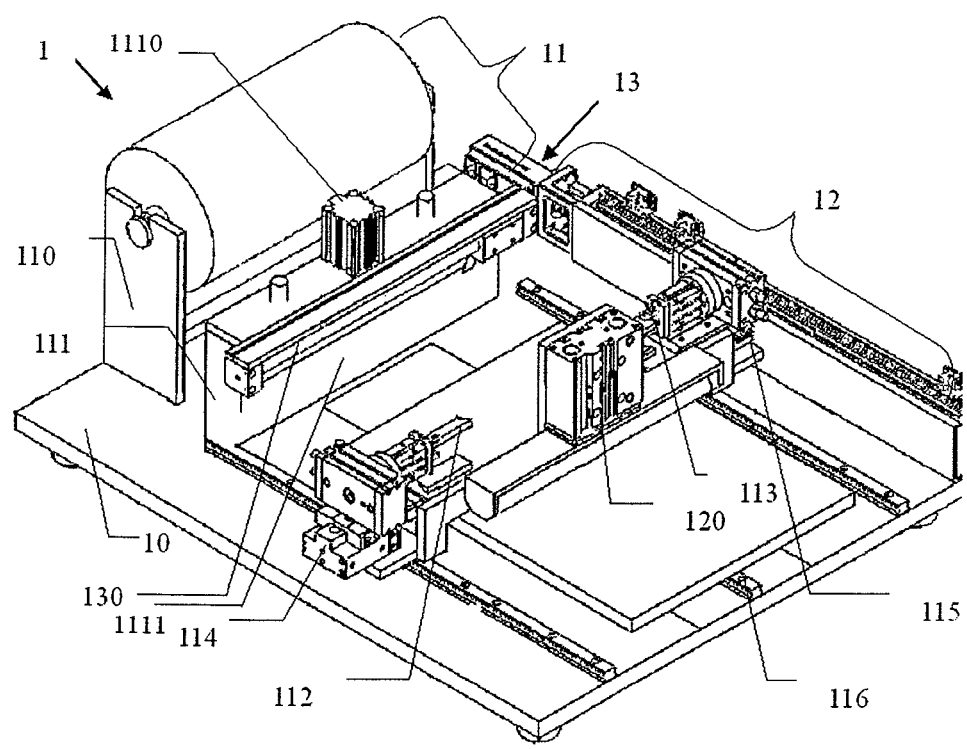
FIG. 1 is a structure diagram of a film coating apparatus according to embodiments of the present invention.

Embodiment 1 of the present invention provides a film coating apparatus, as shown in FIG. 1, comprising:

a feeding unit 11, an attaching unit 12 and a cutting unit 13, which are arranged on a base 10.

The feeding unit 11 is configured to feed a film to be attached onto the surface of a product, and configured to attach the film to a first side face and a second side face of the product. In this embodiment, the product is a light guide plate, a semi-finished backlight product or a finished backlight product.

The attaching unit 12 is connected to the feeding unit 11 and configured to attach the film to the surface of the product.

The cutting unit 13 is connected to the feeding unit 11 and configured to cut the film.

In this embodiment of the present invention, the film coating apparatus is described by taking light guide plates, semi-finished backlight products and finished backlight products to be coated with films manually in the prior art as objects to be coated. However, it should be understood that during the manufacturing of TFT-LCDs, there are many semi-finished products and finished products need to be coated. Therefore, the film coating apparatus provided by the embodiments of the present invention is applicable to the processing procedures of any product needing to be coated. The present invention is not limited to the embodiments described herein.

In addition, it is to be noted that terms of direction, such as 'front', 'back', 'left', 'right', 'upper' and 'lower', will be used in the description of the specific operations of the apparatus with reference to the accompanying drawings. These terms in the embodiment as shown in FIG. 1 means that for example, a direction from the feeding unit 11 to the attaching unit 12 is referred to as front, and the opposite is back; a direction being parallel to the base 10 and perpendicular to the front-back direction is referred to as the left-right direction; and an upward direction being perpendicular to the base 10 is referred to as upper, and the opposite is lower. However, it should be understood that, these terms of direction are provided to make a person skilled in the art understand the solutions of the present invention better, and should not be interpreted as any limitation to the present invention.

Further, the feeding unit 11 specifically comprises a film storage unit 110, a feeding assembly 111, a first rotatable clamp 112 and a second rotatable clamp 113 which are symmetrically disposed, a first drawing assembly 114 and a second drawing assembly 115 which are symmetrically disposed, and at least one guide rail 116.

The film storage unit 110 is configured to place the film.

The feeding assembly 111 is configured to support and fix the film.

The first rotatable clamp 112 and the second rotatable clamp 113 are configured to clamp the film.

The first drawing assembly 114 is connected to the first rotatable clamp 112 and configured to drive the first rotatable clamp 112 to move backward and forward in the film feeding direction.

The second drawing assembly 115 is connected to the second rotatable clamp 113 and configured to drive the second rotatable clamp 113 to move backward and forward in the film feeding direction.

The at least one guide rail 116 is configured to position the product so that a coating portion of the product is located within a film coating region of the film coating apparatus.

It is to be noted that each time the first rotatable clamp 112 and the second rotatable clamp 113 rotate, the rotation angles thereof are the same, ranging from 225° to 360°, and preferably are 225°.

Further, the feeding assembly 111 specifically comprises a feeding compression cylinder 1110 (not shown) and a feeding roller set 1111 (not shown).

The feeding compression cylinder 1110 is configured to move downward to compress the feeding roller set 1111.

The feeding roller set 1111 is connected to the feeding compression cylinder 1110 and configured to support the film.

Further, the first rotatable clamp 112 specifically comprises a first clamp head 1120 (not shown), a first motor 1121 (not shown), a first left-right cylinder 1122 (not shown), and a first front-back cylinder 1123 (not shown).

The first clamp head 1120 is configured to clamp the film.

The first motor 1121 is configured to control the first clamp head 1120 to rotate backward and forward in the film feeding direction.

The first left-right cylinder 1122 is configured to control the first clamp head 1120 to move in the left-right direction with the first clamp head 1120 being in connection with the first drawing assembly 114 so as to finely adjust the position of the first clamp head 1120 in the left-right direction.

The first front-back cylinder 1123 is configured to control the first clamp head 1120 to move in the back-forth direction with the first clamp head 1120 being in connection with the first drawing assembly 114 so as to finely adjust the position of the first clamp head 1120 in the front-back direction.

The second rotatable clamp 113 specifically comprises a second clamp head 1130 (not shown), a second motor 1131 (not shown), a second left-right cylinder 1132 (not shown), and a second front-back cylinder 1133 (not shown).

The second clamp head 1130 is configured to clamp the film.

The second motor 1131 is configured to control the second clamp head 1130 to rotate backward and forward in the film feeding direction.

The second left-right cylinder 1132 is configured to control the second clamp head 1130 to move in the left-right direction with the second clamp head 1130 being in connection with the second drawing assembly 115 so as to finely adjust the position of the second clamp head 1130 in the left-right direction.

The second front-back cylinder 1133 is configured to control the second clamp head 1130 to move in the back-forth direction with the second clamp head 1130 being in connection with the second drawing assembly 115 so as to finely adjust the position of the second clamp head 1130 in the front-back direction.

It is to be noted that to make the film coat the surface of the product evenly and flatly, the first rotatable clamp 112 and the second rotatable clamp 113, which are symmetrically disposed, are required to clamp the two ends of the first material end of the film, respectively, so that the film drawn out by the two rotatable clamp under the drive of the first drawing assembly 114 and the second drawing assembly 115 is flat.

Further, the attaching unit 12 specifically comprises a pressing assembly 120, and a first ejector cylinder 121 (not shown) and a second ejector cylinder 122 (not shown) which are symmetrically disposed.

The pressing assembly 120 is connected to the feeding unit 11, specifically connected to both of the first drawing assembly 114 and the second drawing assembly 115 of the feeding unit 11, configured to press the film on the surface of the product, so as to attach the film closely to the surface of the product.

The first ejector cylinder 121 and the second ejector cylinder 122 are configured to eject the product.

Further, the pressing assembly 120 specifically comprises a pressing cylinder 1200 (not shown) and a roller 1201 (not shown).

The pressing cylinder 1200 is configured to move downward to compress the roller 1201.

The roller 1201 is configured to press the film in a rolling manner, so that the film is closely attached to the surface of the product.

Further, the cutting unit 13 specifically comprises a blade 130 and a cutting cylinder 131 (not shown).

The blade 130 is connected to the feeding unit 11, specifically to the feeding assembly 111 of the feeding unit, and configured to cut the film.

The cutting cylinder 131 is connected to the blade 130 and configured to control the movement of the blade 130, so that the blade 130 cuts the film.

Further, the guide rail 116 further comprises a telescopic support frame 1160 (not shown) for supporting the product.

It is to be noted that all components in this embodiment of the present invention are connected to one other by fasteners such as bolts, and the connection manner will not be repeatedly described herein.

Embodiments of the present invention provide the film coating apparatus, comprising the feeding unit, the attaching unit and the cutting unit, which are arranged on the base, wherein the feeding unit is configured to feed the film to be attached onto the surface of the product, such as a light guide plate, a semi-finished backlight product and a finished backlight product; the attaching unit is connected to the feeding unit and configured to attach the film onto the surface of the product; the cutting unit is connected to the feeding unit and configured to cut the film. According to this solution, the apparatus capable of automatically coating the product with the film by the feeding unit, the attaching unit and the cutting unit which are all arranged on the base can be used for film coating of a light guide plate, a semi-finished backlight product and a finished backlight product, the labor intensity of operators is greatly reduced, the productivity is liberated, the production efficiency is further improved, and the bottleneck in the production of TFT-LCDs is overcome.

Embodiment 2

Figure 2:
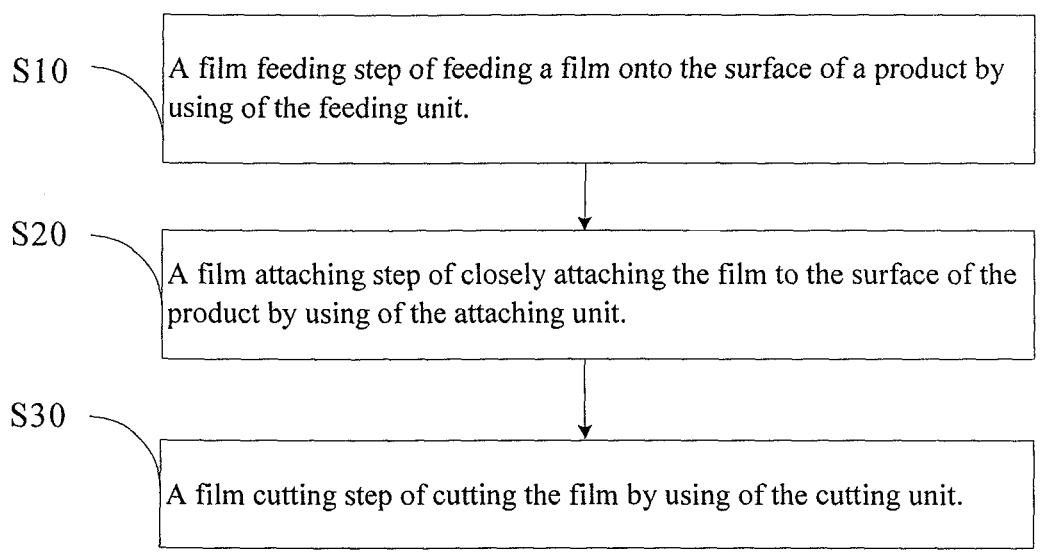
FIG. 2 and FIG. 3 are flowcharts of a film coating method according to embodiments of the present invention, respectively.

Embodiment 2 of the present invention provides a film coating method, as shown in FIG. 2, including:

step S10: a film feeding step of feeding a film onto the surface of a product by using of the feeding unit;

step S20: a film attaching step of closely attaching the film to the surface of the product by using of the attaching unit; and step S30: a film cutting step of cutting the film by using of the cutting unit.

Figure 3:
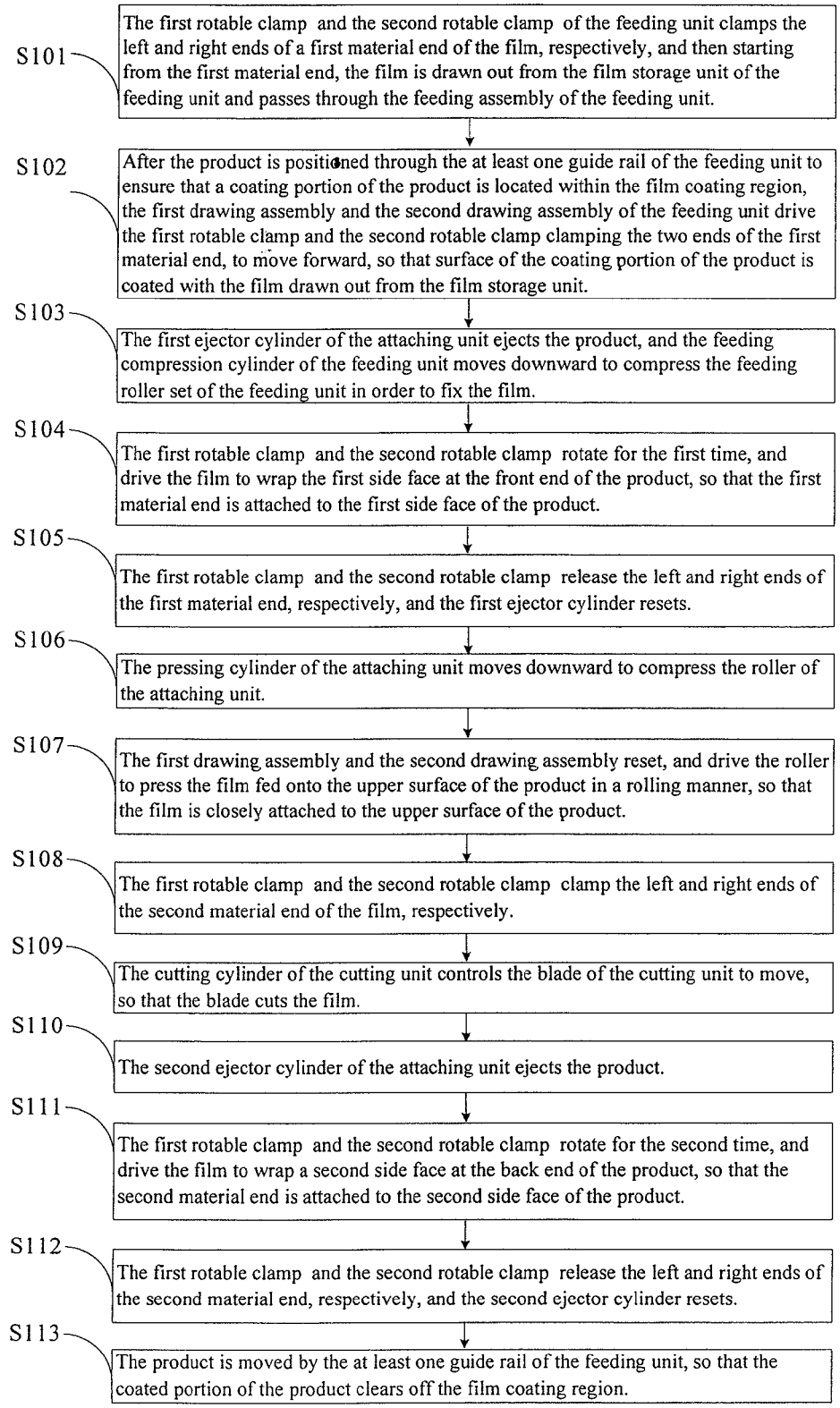

Preferably, the film feeding step in step S10 may specifically include the following steps S101-S103 as shown in FIG. 3.

step S101: The first rotatable clamp and the second rotatable clamp of the feeding unit clamp two ends of a first material end of the film, respectively, so that, starting from the first material end, the film is drawn out from the film storage unit of the feeding unit and then passes through the feeding assembly of the feeding unit.

It is to be noted that the first material end refers to the front end of the fed film while the second material end to be described below refers to the rear end of the fed film. 'Front' and 'rear' are determined relative to the film feeding direction.

In the case that there are films placed in the film storage unit of the film coating apparatus, when a product is to be coated with a film, firstly, the first rotatable clamp and the second rotatable clamp are configured to clamp the left and right ends of the first material end of the film, respectively, and then, starting from the first material end, the film is drawn out from the film storage unit and passes through the feeding assembly.

step S102: After the product is positioned through the at least one guide rail of the feeding unit to ensure that a coating portion of the product is located within the film coating region, the first drawing assembly and the second drawing assembly of the feeding unit drive the first rotatable clamp and the second rotatable clamp clamping the two ends of the first material end, to move forward, so that surface of the coating portion of the product is coated with the film drawn out from the film storage unit.

It is to be noted that after the product is positioned through the at least one guide rail of the feeding unit to ensure that a coating portion of the product is located within the film coating region, the first drawing assembly and the second drawing assembly drive the first rotatable clamp and the second rotatable clamp clamping the left and right ends of the first material end, to move in a forward direction away from the film storage unit, so that the film is drawn out from the film storage unit and coats the surface of the coating portion of the product.

step S103: The first ejector cylinder of the attaching unit ejects the product, and the feeding compression cylinder of the feeding unit moves downward to compress the feeding roller set of the feeding unit so as to fix the film.

This step is executed to fix the film to facilitate attaching of the film onto the surface and side faces of the product in the subsequent attaching step. Therefore, before attaching the film onto the surface and side faces of the product, the first ejector cylinder needs to eject the product and the feeding compression cylinder moves downward to compress the feeding roller set so as to fix the film in order to facilitate attaching.

Preferably, the film attaching step in step S20 may specifically include the following steps S104-S107 as shown in FIG. 3.

step S104: The first rotatable clamp and the second rotatable clamp rotate for the first time, and drive the film to wrap the first side face at the front end of the product, so that the first material end is attached to the first side face of the product.

To coat the surface of the product with a film entirely, besides attaching the film onto the upper surface of the product, the film needs to be attached to the side faces adjacent to the upper surface of the product, i.e., the first side face at the front end of the product and the second side face at the back end of the product.

The first rotation of the first rotatable clamp and the second rotatable clamp can drive the first material end of the film to move to a position where the film will wrap the first side face at the front end of the product, so that the first material end is attached to the first side face of the product. The rotation angle of the first rotatable clamp and the rotation angle of the second rotatable clamp are identical. Usually, during the production, the rotation angles of both the first rotatable clamp and the second rotatable clamp are preferably 225°.

It is to be noted that to make the film coat the surface of the product evenly and flatly, the first rotatable clamp and the second rotatable clamp, which are symmetrically disposed, are required to clamp the two ends of the first material end of the film, respectively, so that the film drawn out by the two rotatable clamp under the drive of the first drawing assembly and the second drawing assembly is flat.

step S105: The first rotatable clamp and the second rotatable clamp release the left and right ends of the first material end, respectively, and the first ejector cylinder resets.

After the first material end being attached to the first side face of the product, the first rotatable clamp and the second rotatable clamp release the film, respectively, and the first ejector cylinder resets to its initial state.

step S106: The pressing cylinder of the attaching unit moves downward to compress the roller of the attaching unit.

step S107: The first drawing assembly and the second drawing assembly reset, and drive the roller to press the film fed onto the upper surface of the product in a rolling manner, so that the film is closely attached to the upper surface of the product.

The film needs to coat and to be attached onto the upper surface of the product. In order to make the film closely attached to the upper surface of the product, the pressing cylinder needs to move downward to compress the roller. Subsequently, as the first drawing assembly and the second drawing assembly reset, i.e., move back to the back end of the product from the front end of the product, the roller is driven to press the film coating the upper surface of the product in a rolling manner, so that the film is closely attached to the upper surface of the product.

Preferably, the film cutting and fixing step in step S30 may specifically include the following steps S108-S112 as shown in FIG. 3.

step S108: The first rotatable clamp and the second rotatable clamp are configured to clamp left and right ends of the second material end of the film, respectively.

After the first drawing assembly and the second drawing assembly reset, the first rotatable clamp and the second rotatable clamp are driven to reset, i.e., move back to the back end of the product. At this time, the first material end of the film is attached to the first side face of the product, and the film is closely attached to the upper surface of the product. Now, the film needs to be cut and the second material end needs to be attached to the second side face of the product.

First, the first rotatable clamp and the second rotatable clamp clamp the left and right ends of the second material end of the film, respectively.

It is to be noted that the film is not cut right now, but the film clamped between the first rotatable clamp and the second rotatable clamp after cutting is refer to as the second material end and which is to be attached to the second side face. Therefore, the positions clamped by the first rotatable clamp and the second rotatable clamp respectively are referred to as the left and right ends of the second material end.

step S109: The cutting cylinder of the cutting unit controls the blade of the cutting unit to move, so that the blade cuts the film.

step S110: The second ejector cylinder of the attaching unit ejects the product.

step S111: The first rotatable clamp and the second rotatable clamp rotate for the second time, and drive the film to wrap the second side face at the back end of the product, so that the second material end is attached to the second side face of the product.

By controlling the blade to move by the cutting cylinder, the blade is allowed to cut the film at a proper position. Furthermore, after the second ejector cylinder ejects the product, the second material end of the film is driven by the second rotation of the first rotatable clamp and the second rotatable clamp to move to a position where the film will wrap the second side face at the back end of the product, so that the second material end is attached to the second side face of the product. The rotation angle of the first rotatable clamp and the rotation angle of the second rotatable clamp are identical. Usually, during the production, the rotation angles of both the first rotatable clamp and the second rotatable clamp are preferably 225°.

step S112: The first rotatable clamp and the second rotatable clamp release the two ends of the second material end, respectively, and the second ejector cylinder resets.

After the second material end being attached to the second side face of the product, the first rotatable clamp and the second rotatable clamp release the film, and the second ejector cylinder resets to its initial state. So far, the process of coating the product with the film ends.

Further preferably, the film coating method provided by one embodiment of the present invention further includes step S113 as shown in FIG. 3.

step S113: The product is moved by the at least one guide rail of the feeding unit, so that the coated portion of the product clears off the film coating region.

After the first rotatable clamp and the second rotatable clamp release the film and the second ejector cylinder resets, the product is moved by the at least one guide rail, so that the coated portion of the product clears off the film coating region.

Subsequently, a next product or a next coating portion of the same product is moved by the at least one guide rail to the film coating region for coating. Steps S10-S30 are repeated in turn until the coating of the whole product is completed.

It is to be further noted that in the embodiments as shown, the first rotation of the first rotatable clamp and the second rotatable clamp refers to forward rotation, and the second rotation of the first rotatable clamp and the second rotatable clamp refers to backward rotation.

According to the film coating apparatus and film coating method provided by the embodiments of the present invention, by automatically attaching a film onto a product through the feeding unit, the attaching unit and the cutting unit which are all arranged on the base, the film coating of a light guide plate, a semi-finished backlight product and a finished backlight product can be achieved, the labor intensity of operators is greatly reduced, the productivity is liberated, and the production efficiency is further improved. Meanwhile, coating deviation resulted from human factors is avoided during the manual film coating operation, and the bottleneck in the automation of producing TFT-LCDs is overcome.

By the above description of the implementation manners, a person skilled in the art can clearly understand that for convenient and simple description, illustration is merely given by the division of the above functional modules. During practical application, the above functions may be completed by different functional modules as required, that is, the interior structure of the device may be divided into different functional modules to complete all or a part of the above functions. The specific working process of the systems, devices and units described above may refer to the corresponding process in the foregoing embodiment of the method and will not be repeatedly described herein.

In the several embodiments provided by the application, it should be understood that the disclosed systems, devices and methods may be implemented in other ways. For example, the described embodiments of the devices are merely exemplary. The division of the modules or units is merely logic function division, and other division ways are possible during the actual implementation. For example, a plurality of units or assemblies may be combined together or integrated into another system; or, some features may be omitted or not executed. Besides this, the displayed or discussed coupling or direct coupling or connection via communication may be implemented via some interfaces. The indirect coupling or connection via communication between devices or units may be electric connection, mechanical connection or other connections.

The units described as separating components may be or may be not physical separating components. The components described as display units may be or may be not physical units, and may be located in one place or distributed over a plurality of network units. A part of or all these units may be selected to implement the objects of the embodiments according to actual requirements.

In addition, the functional units in the embodiments of the present invention may be integrated in one processing unit or may physically exist as individual units, or two or more units may be integrated in one unit. The integrated unit may be implemented as a hardware or software functional unit.

If implemented as a software functional unit and sold or used as an independent product, the integrated unit can be stored in a computer readable storage medium. On the basis of such understanding, essentially, the part contributing to the prior art of the technical solutions of the present invention or all or a part of the technical solutions may be embodied as a software product. The computer software product is stored in a storage medium including a plurality of instructions that enable a computer apparatus (namely a personal computer, a server, or a network apparatus, etc.) or a processor to execute all or a part of steps of the method provided by the embodiments of the present invention. The foregoing storage medium includes USB flash disks, mobile hard disks, ROM (Read-Only Memory), RAM (Random Access Memory), diskettes or CDs or various other media that can storage program codes.

The description above only illustrates specific implementation manners of the present invention. However, the protection scope of the present invention is not limited thereto. Any changes or alternations that may be easily made by a person skilled in the art without departing from the technical scope disclosed in the present invention should be included within the protection scope of the present invention. Hence, the protection scope of the present invention should be subject to that defined by the appended claims.

The invention claimed is:

1. A film coating apparatus, comprising:
a feeding unit, an attaching unit and a cutting unit, which are arranged on the base, the film coating apparatus characterized in that:
the feeding unit is configured to feed a film to be attached onto the surface of a product;
the attaching unit is connected to the feeding unit and configured to attach the film to the surface of the product; and
the cutting unit is connected to the feeding unit and configured to cut the film,
wherein, the feeding unit comprises a first rotatable clamp and a second rotatable clamp which are symmetrically disposed; a first drawing assembly and a second drawing assembly which are symmetrically disposed; wherein
the first rotatable clamp and the second rotatable clamp are configured to clamp the film;
the first drawing assembly is connected to the first rotatable clamp and configured to drive the first rotatable clamp to move backward and forward in the film feeding direction;
the second drawing assembly is connected to the second rotatable clamp and configured to drive the second rotatable clamp to move backward and forward in the film feeding direction.

2. The film coating apparatus according to claim 1, wherein the feeding unit further comprises a film storage unit, a feeding assembly and at least one guide rail, and wherein
the film storage unit is configured to place the film;
the feeding assembly is configured to support and fixing the film;
the at least one guide rail is configured to position the product so that a coating portion of the product is located within a film coating region of the film coating apparatus.

3. The film coating apparatus according to claim 2, wherein the feeding assembly comprises a feeding compression cylinder and a feeding roller set, and wherein
the feeding compression cylinder is configured to move downward to compress the feeding roller set; and
the feeding roller set is connected to the feeding compression cylinder and configured to support the film.

4. The film coating apparatus according to claim 2, wherein
the first rotatable clamp comprises a first clamp head, a first motor, a first left-right cylinder, and a first front-back cylinder,
wherein the first clamp head is configured to clamp the film;

the first motor is configured to control the first clamp head to rotate backward and forward in the film feeding direction;

the first left-right cylinder is configured to control the first clamp head to move in a left-right direction with the first clamp head being in connection with the first drawing assembly so as to finely adjust the position of the first clamp head in the left-right direction;

the first front-back cylinder is configured to control the first clamp head to move in a back-forth direction with the first clamp head being in connection with the first drawing assembly so as to finely adjust the position of the first clamp head in the front-back direction;

the second rotatable clamp comprises a second clamp head, a second motor, a second left-right cylinder, and a second front-back cylinder, wherein the second clamp head is configured to clamp the film;

the second motor is configured to control the second clamp head to rotate backward and forward in the film feeding direction;

the second left-right cylinder is configured to control the second clamp head to move in the left-right direction with the second clamp head being in connection with the second drawing assembly so as to finely adjust the position of the second clamp head in the left-right direction; and the second front-back cylinder is configured to control the second clamp head to move in the back-forth direction with the second clamp head being in connection with the second drawing assembly so as to finely adjust the position of the second clamp head in the front-back direction.

5. The film coating apparatus according to claim 2, wherein the guide rail further comprises a telescopic support frame for supporting the product.

6. The film coating apparatus according to claim 1, wherein the attaching unit comprises a pressing assembly, and a first ejector cylinder and a second ejector cylinder which are symmetrically disposed, wherein the pressing assembly is connected to the feeding unit and configured to press the film on the surface of the product, so that the film is closely attached to the surface of the product; and the first ejector cylinder and the second ejector cylinder are configured to eject the product.

7. The film coating apparatus according to claim 6, wherein the pressing assembly comprises a pressing cylinder and a roller, wherein the pressing cylinder is configured to move downward to compress the roller; and the roller is configured to press the film in a rolling manner, so that the film is closely attached to the surface of the product.

8. The film coating apparatus according to claim 1, wherein the cutting unit comprises a blade and a cutting cylinder, wherein the blade is connected to the feeding unit and configured to cut the film; and the cutting cylinder is connected to the blade and configured to control the movement of the blade, so that the blade cuts the film.

9. A film coating method for coating a product located within a film coating region of a film coating apparatus which comprises, on a base, a feeding unit, an attaching unit and a cutting unit, the film coating method comprises:

a film feeding step of feeding a film onto the surface of the product by using of the feeding unit, comprising a first rotatable clamp and a second rotatable clamp of the feeding unit clamping two ends of a first material end of the film, respectively, so that starting from the first material end, the film is drawn out from a film storage unit of the feeding unit and then passes through a feeding assembly of the feeding unit; and after the product is positioned through at least one guide rail of the feeding unit to ensure that a coating portion of the product is located within the film coating region, a first drawing assembly and a second drawing assembly of the feeding unit driving the first rotatable clamp and the second rotatable clamp, clamping the two ends of the first material end, to move in a film feeding direction, so that a surface of the coating portion of the product is coated with the film drawn out from the film storage unit;

a film attaching step of closely attaching the film to the surface of the product by using of the attaching unit; and a film cutting step of cutting the film by using of the cutting unit.

10. The film coating method according to claim 9, wherein the film feeding step further comprises:

a first ejector cylinder of the attaching unit ejecting the product, and a feeding compression cylinder of the feeding unit moving downward to compress a feeding roller set of the feeding unit so as to fix the film.

11. The film coating method according to claim 10, wherein the film attaching step comprises:

the first rotatable clamp and the second rotatable clamp rotating for the first time, and driving the film to wrap a first side face at the front end of the product, so that the first material end is attached to the first side face of the product;

the first rotatable clamp and the second rotatable clamp releasing the two ends of the first material end, respectively, and the first ejector cylinder resetting;

a pressing cylinder of the attaching unit moving downward to compress a roller of the attaching unit; and the first drawing assembly and the second drawing assembly resetting, and driving the roller to press the film fed onto the upper surface of the product in a rolling manner, so that the film is closely attached to the upper surface of the product.

12. The film coating method according to claim 11, wherein the film cutting step comprises:

the first rotatable clamp and the second rotatable clamp clamping two ends of a second material end of the film, respectively;

a cutting cylinder of the cutting unit controlling a blade of the cutting unit to move, so that the blade cuts the film;

a second ejector cylinder of the attaching unit ejecting the product;

the first rotatable clamp and the second rotatable clamp rotating for the second time, and driving the film to wrap a second side face at the back end of the product, so that the second material end is attached to the second side face of the product; and the first rotatable clamp and the second rotatable clamp releasing the two ends of the second material end, respectively, and the second ejector cylinder resetting.

13. The film coating method according to claim 12, wherein the first rotation of the first rotatable clamp and the second rotatable clamp refers to rotating forward in the film feeding direction, and the second rotation of the first rotatable clamp and the second rotatable clamp refers to rotating backward in the film feeding direction.

14. The film coating method according to claim 9, further comprising the step of moving the product by using of at least one guide rail of the feeding unit, so that the coated portion of the product clears off the film coating region.

* * * * *